(12) United States Patent
Cheng et al.

(10) Patent No.: US 8,385,247 B2
(45) Date of Patent: Feb. 26, 2013

(54) COMMUNICATION SYSTEMS AND METHODS WITH RESOURCE MANAGEMENT FOR OVERLAPPING MULTICAST AND BROADCAST SERVICE ZONES

(75) Inventors: Ray-Guang Cheng, Keelung (TW); Kuo-Jui Huang, Jhonghe (TW); Jen-Shun Yang, Zhubei (TW)

(73) Assignees: Industrial Technology Research Institute, Hsinchu (TW); National Taiwan University of Science and Technology, Taipei (TW)

( * ) Notice: Subject to any disclaimer, the term of this patent is extended or adjusted under 35 U.S.C. 154(b) by 562 days.

(21) Appl. No.: 12/622,912

(22) Filed: Nov. 20, 2009

(65) Prior Publication Data

US 2010/0135196 A1 Jun. 3, 2010

Related U.S. Application Data

(60) Provisional application No. 61/119,430, filed on Dec. 3, 2008.

(51) Int. Cl.
*H04H 20/71* (2008.01)
*H04W 4/00* (2009.01)

(52) U.S. Cl. .................................... 370/312; 370/329

(58) Field of Classification Search ............... None
See application file for complete search history.

(56) References Cited

U.S. PATENT DOCUMENTS

2003/0197642 A1* 10/2003 Smith ..................... 342/360

* cited by examiner

*Primary Examiner* — John Blanton
(74) *Attorney, Agent, or Firm* — Finnegan, Henderson, Farabow, Garrett & Dunner, LLP

(57) ABSTRACT

A method for providing resource allocation in a communication network includes identifying at least two broadcast zones for receiving broadcast services in the communication network and generating a first index based on a relative relationship among the at least two broadcast zones. The first index includes information indicative of whether a first broadcast zone overlaps with at least one other broadcast zone. The method further includes generating a second index based on the relative relationship among the at least two broadcast zones; assigning at least one identifier to each of the at least two broadcast zones based on the first index and the second index; and enabling data transmissions to the at least two broadcast zones based on the assigned identifiers and using the at least one communication resource associated with the identifiers. The second index may include information indicative of a number of broadcast zones overlapped with the first broadcast zone. Each identifier may be associated with at least one communication resource, with distinct identifiers being assigned to overlapping broadcast zones of the at least two broadcast zones.

24 Claims, 10 Drawing Sheets

300

400

COMMUNICATION SYSTEMS AND METHODS WITH RESOURCE MANAGEMENT FOR OVERLAPPING MULTICAST AND BROADCAST SERVICE ZONES

RELATED APPLICATIONS

This application claims the benefit of priority of U.S. Provisional Application No. 61/119,430, filed Dec. 3, 2008, and titled "Methods for Radio Resource Management in Overlapping MBS Zone Area," the entire contents of which are herein incorporated by reference.

TECHNICAL FIELD

This invention relates to communication systems and methods and, more specifically, to communication systems and methods with communication resource management for overlapping multicast and broadcast service zones.

BACKGROUND

In the past, most wireless communication systems were primarily focused on providing voice services. More recently, with the evolution of various wireless technologies, the focus has shifted to providing other services, such as multimedia or data services, in addition to voice services. As an example, there is an increasing demand for multimedia applications and services, such as mobile internet, streaming audio/video, and other data and video services. To meet the bandwidth constraints posed by the various multimedia services, Multicast and Broadcast Services (MBS) or Multimedia Broadcast Multicast service (MBMS) have emerged as implementations that provide broadcasting services in current and future cellular networks.

Taking a system equipped with MBS capabilities as an example, a number of mobile terminals within a given geographical area (which can be named as an MBS zone) can share and utilize same radio resources, such as by having common frequency, time, codes, or other communication parameters such radio resource units. Because the same resources are shared, rather than divided, by multiple users, the data bandwidth can be increased to transfer large amounts of data in a short period of time.

Depending on the applications, one potential problem for MBS service is signal interferences at overlapping MBS zones. For example, a base station (BS) that is a member of or within two or more MBS zones may be subject to undesirable interference, such as transmission of different data over the same channel or sub-channel at the same time. However, on the other hand, if two zones do not overlap, it may be beneficial to allow two concurrent transmissions to exist for better resources utilization.

Therefore, it may be desirable to provide resource management that may manage radio resources for various MBS zones, some of which may be overlapping.

SUMMARY

Consistent with some embodiments of the present invention, a method for providing resource allocation in a communication network may include identifying at least two broadcast zones, such as MBS zones, for receiving broadcast services in the communication network and generating a first index based on a relative relationship among the at least two broadcast zones. The first index includes information indicative of whether a first broadcast zone overlaps with at least one other broadcast zone. The method may also include generating a second index based on the relative relationship among the at least two broadcast zones and assigning at least one identifier to each of the at least two broadcast zones based on the first index and the second index. The second index may include information indicative of a number of broadcast zones overlapped with the first broadcast zone. Each identifier may be associated with at least one communication resource, with distinct identifiers being assigned to overlapping broadcast zones. The method may further include enabling data transmissions to the broadcast zones based on the assigned identifiers and using the at least one communication resource associated with the identifiers.

In another embodiment, the method for providing resource allocation in a communication network may further include updating the first index, when a variation to one of the at least two broadcast zone occurs, based on the relative relationship among the at least two broadcast zones. The updated first index may include information indicative of whether the first broadcast zone overlaps with at least one other broadcast zone. The method may further include re-assigning the at least one identifier to each of the broadcast zones if the updated first index is different from the first index and enabling the data transmissions to the broadcast zones based on the identifiers and using the at least one communications resource associated with the identifiers.

In another embodiment, a system for providing resource allocation in a communication network may include a zone identification unit (ZIU), a resource scheduling unit (RSU), a resource allocation unit (RAU), and a communication interface unit (CIU). The ZIU is configured to identify at least two broadcast zones, such as MBS zones, for receiving broadcast services in the communication network. A resource scheduling unit (RSU) is coupled with the ZIU and configured to generate a first index and a second index based on a relative relationship among the at least two broadcast zones. A resource allocation unit (RAU) is coupled with the RSU and configured to assign at least one identifier to each of the at least two broadcast zones based on the first index and the second index. A communication interface unit (CIU) is coupled with the RAU and configured to enable data transmissions to the at least two broadcast zones based on the assigned identifiers and using the at least one communications resource associated with the identifiers.

Additional features and advantages of the invention will be set forth in part in the description which follows, and in part will be obvious from the description, or may be learned by practice of the invention. The features and advantages of the invention will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments of the invention and, together with the description, serve to explain the principles of the invention.

The accompanying drawings, which are incorporated in and constitute a part of this specification, illustrate embodiments of the invention and, together with the description, serve to explain the principles of the invention.

DETAILED DESCRIPTION

Broadcast services such as Multicast and broadcast service (MBS), also referred to as multimedia broadcast and multicast services (MBMS), have emerged as one of broadcasting services of choice in modern networks, such as WiMAX networks. Taking an MBS service as an example, data that can support various steaming services, file download services or carousel services can be distributed to a group of subscribers via a common broadcast or multicast channel.

Figure 1:
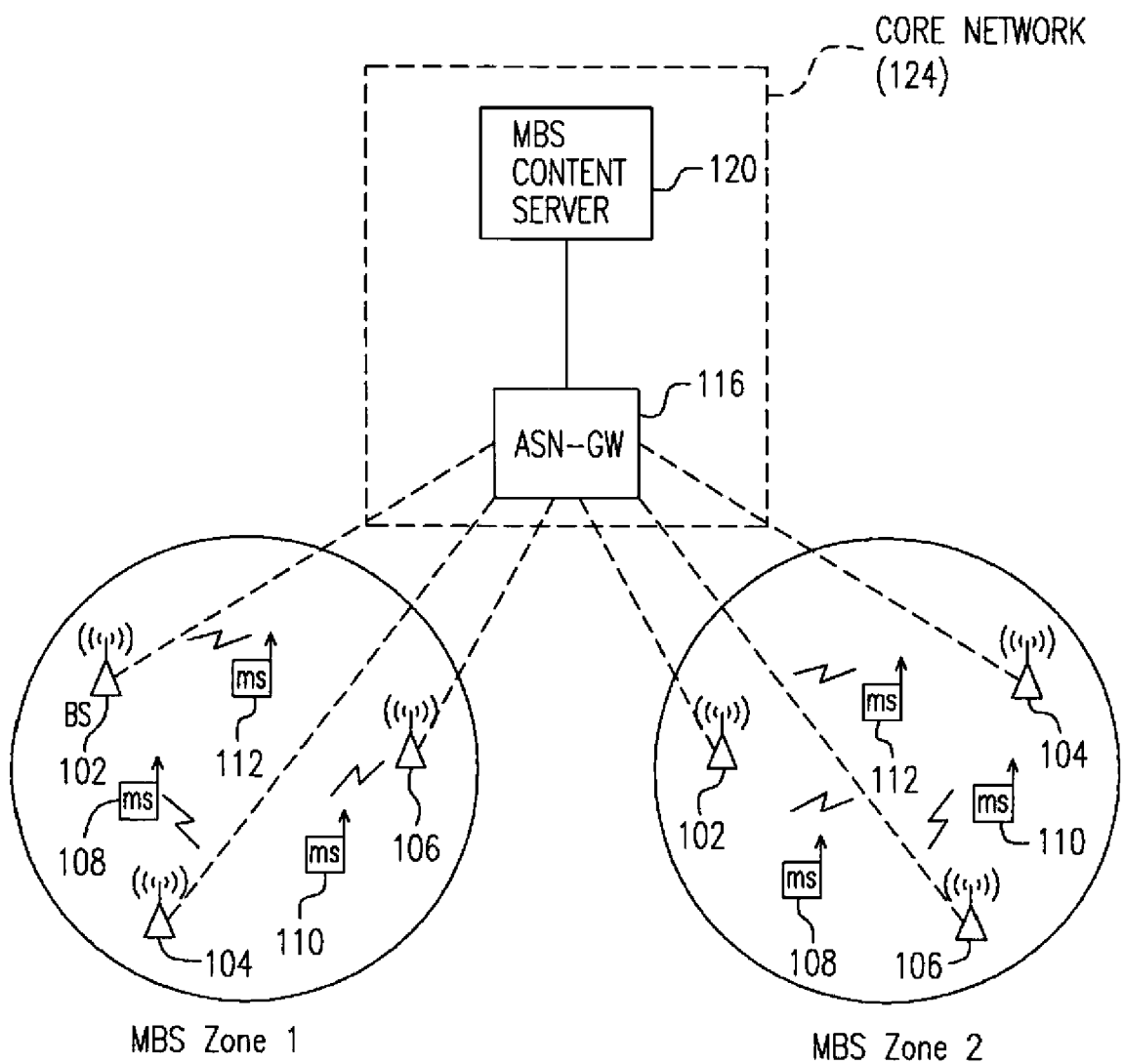
FIG. 1 illustrates a block diagram of a exemplary communication network consistent with disclosed embodiments.

FIG. 1 illustrates a block diagram of an exemplary network 100 that can be configured for providing an MBS service consistent with some embodiments of the present invention. As an illustrative example, the following describes network 100 as an IEEE 802.16e network. Depending various factors such as applications, system designs, and communication protocols, network 100 can be any type of wireless and/or wired network. Therefore, the disclosed embodiments are not limited a particular type of network.

In one example, the IEEE 802.16e standard can define an MBS zone as a geographical area in which multiple base stations (BS's) can synchronously broadcast same data over a set of sub-channels at the same time. Additionally, the multiple BS's in a given MBS zone can transmit data simultaneously using the same connection identifier (CID) and security association (SA).

By using the same set of radio resources (frequency, time, etc.), various subscriber terminals within an operating range of one or more BS's (in a given MBS zone) can accurately receive data at a higher bandwidth and at an increased energy level, because of a combined signal that each subscriber terminal can receive simultaneously from the multiple BS's. Additionally, the synchronized transmission by multiple BS's can be advantageous to a subscriber terminal that is moving to other BS's (within an MBS zone of between one or more MBS zones) because a need re-establishing an MBS connection by the subscriber terminal can be eliminated.

As shown in FIG. 1, network 100 can include MBS zones 1 and 2. Each of MBS zones 1 and 2 further include base stations (BS) 102, 104, and 106 that can communicate with subscriber terminals 108, 110, and 112. A base station may be a fixed or mobile transceiver that communicates/exchanges data with one or more subscriber terminals within a certain range. A subscriber terminal may be a fixed or mobile communication device, such as a mobile telephone, a personal computer, a television receiver, a MP3 player, a personal digital assistant (PDA) or any other video, audio, or data device capable of radio communications. In the following description and claims, all fixed and/or wireless subscriber terminals will be collectively referred as mobile stations (MS).

As an example, FIG. 1 depicts each MBS zone in network 100 as including three BS's (102, 104, and 106) and three MS's (108, 110, and 112). However, there may be any number of BS's and/or MS's that can be included in a network such as exemplary network 100. Therefore, the present disclosure is not limited in the number of BS's and/or MS's that may be included and supported by a network that is in accordance with the present invention.

As shown FIG. 1, BS (102, 104, and 106) of each MBS zone can be coupled to an Access Service Network-Gateway (ASN-GW) 116, and ASN-GW 116 can be further coupled to an MBS content server 120. In the disclosed embodiments and as an example, couple may mean that two coupled elements or devices may communicate, cooperate, interact, or otherwise exchange information with each other with or without a physical connection and directly or indirectly. MBS server 120 can manage and control an MBS service, and transmit MBS content generated by one or more content providers to various mobile stations (such as exemplary MS's 108, 110, and 112) via ASN-GW 116 and one or more base stations (such as exemplary BS's 102, 104, and 106). In some embodiments, MBS server 120 and ASN-GW 116 can be included as part of a core network 124.

As an example, FIG. 1 depicts network 100 as including two MBS zones (such as exemplary MBS zones 1 and 2) each including three BS's (such as BS 102, 104, and 106) coupled to a single ASN-GW (such as exemplary ASN-GW 116). However, there may be any number of overlapping and/or non-overlapping MBS zones that can include any number of BS's coupled to any number of ASN-GW's. Therefore, the present disclosure is not limited in the number of MBS zones and/or number of ASN-GW's that may be included and supported by a network that is in accordance with the present invention.

In some embodiments, ASN-GW 116 can be responsible for managing connections between an MBS server and various mobile stations operating in a given MBS zone. For example, in exemplary network 100, ASN-GW 116 can manage connections between MBS server 120 and each of MS 108, 110, and 112 in MBS zones 1 and 2. Furthermore, ASN-GW 116 can also be configured to forward content received from MBS server 120 to every base station (such as BS 102, 104, and 106) operating in MBS zones 1 and 2.

In some embodiments, in addition to managing a connection between the various MS's in network 100, ASN-GW 116 can also maintain the mobility of the MS's from one MBS zone to another (and vice versa), by forwarding content received from MBS server 120 to every BS in a corresponding MBS zone. Furthermore, BS's (102, 104, and 106) can provide a radio connection to MS's (106, 108, and 110) for content from the ASN-GW 116 to be forwarded to MS's (106, 108, and 110).

Generally, an MBS Service-Flow (MBSF) can carry information to a set of MS's. Typically, an ASN-GW can access one or more MS's in an MBS zone via a single BS or via multiple BS's. In a single BS approach, an MBSF can be mapped to a Connection Identifier (CID) within a specific BS, i.e. the CID is uniquely specified on a "per BS basis". For example, in a single BS approach, ASN-GW 116 can access MS's (106, 108, and 110) in MBS zone 1 via any one of BS's (102, 104, and 106). If BS 102 of MBS zone 1 is assumed to be the approach selected by ASN-GW 116 for access to MS's 106, 108, and 110; then BS 102 can be assigned a unique CID.

In a multi-BS approach, data can be transmitted over a plurality of BS's in a network in a synchronized manner i.e. an ASN-GW can access a group of MS's via multiple BS's. In addition, an MBSF can be mapped to a CID that can be unique to all the BS's within an MBS zone. For example, in a multi-BS approach, ASN-GW 116 can access MS's (106, 108, and 110) in MBS zone 1 via more than one of BS's (102, 104, and 106). Therefore, all of BS's (102, 104, and 106) of MBS zone 1 can be assigned a unique CID.

Furthermore, a Multi-BS access method can enable a MS to receive MBS content, after successfully registering and establishing a connection with multiple BSs. As explained above, this transmission method can require that the group of BSs participating in the same Multi-BS-MBS service to be synchronized such that data can be transmitted by all these BSs simultaneously, with the same CID and Security Association (SA). It should be noted that in some embodiments, a MS may not have to be registered with a specific BS from which it can receives MBS transmissions.

In some embodiments, a MS such as exemplary MS 108 can start a reception of a particular MBS content over the air interface by setting up an MBS Media Access Control (MAC) connection with a serving BS such as exemplary BS 102. During the connection setup procedure, MS 108 can be assigned an ID of the MBS MAC connection (known as a Multicast Connection ID, or MCID) that can be used for reception of subscribed content within a specific MBS zone that can be identified by an MBS zone ID.

MBS traffic signals for multi-BS MBS connections can then be sent from BS 102 as data bursts within major time partitions in a downlink (DL) part of a MAC frame. These time partitions can be referred to as permutation zones as they can be distinguished by how sub-carriers of an Orthogonal Frequency Division Multiplexed (OFDM) signal can distributed and grouped into sub-channels. In another words, an MBS permutation zone can be a time partition within frames that contain MBS data. In some embodiments, a permutation zone can contain one or more MBS data bursts, and an MBS data burst can contain one or more MAC Protocol Data Units (PDUs).

Figure 2:
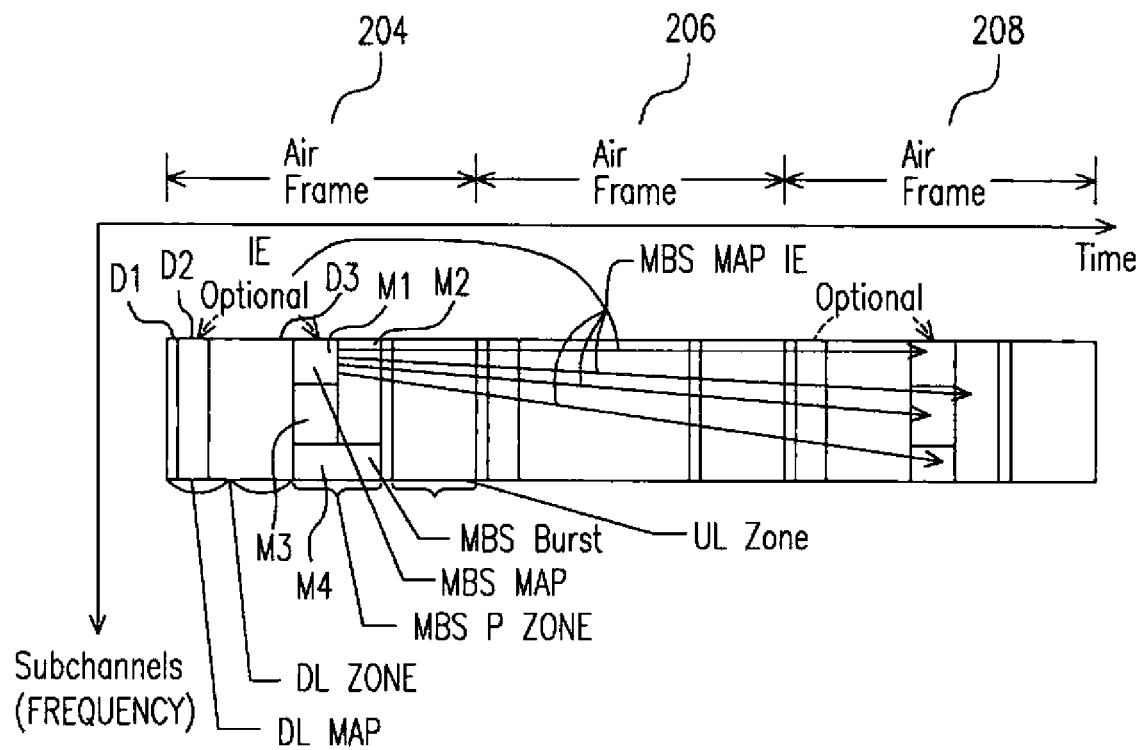
FIG. 2 illustrates a exemplary structure of a transmission frame consistent with disclosed embodiments.

FIG. 2 illustrates a frequency/time resource allocation structure of an MBS transmission consistent with some embodiments of the present invention. As shown in FIG. 2, an MBS transmission can include one or more MAC frames such as exemplary frames 204, 206, and 208. As further shown in FIG. 2, during a given time duration, each frame can occupy a given frequency space.

Typically, an MAC frame such as exemplary frame 202 can include a Downlink zone (DL zone), an MBS permutation zone (MBS P zone) and an Uplink zone (UL zone). Each of these zones can further be divided into one or more bursts where each burst can be used to transmit different types of data. For example, DL zone can include bursts such as exemplary bursts $D_1, D_2, D_3$ where as MBS zone can include bursts such as exemplary bursts $M_1, M_2, M_3$, and $M_4$.

As shown in FIG. 2, in a frame such as exemplary frame 202, BSs can transmit resource allocation information to the MSs through a Media Access Protocol (MAP) messages that can reside in one or more bursts at the beginning of the downlink part of the frame. As shown in FIG. 2, a downlink-MAP (DL MAP) message can be used for transmitting downlink resource allocation information. In some embodiments, the DL MAP message can include various information elements (IEs) that can contain MAC frame control information.

As shown in FIG. 2, frame 202 can further include an MBS MAP IE that can specify where an MBS permutation zone (or MBS data) starts within a frame. In some embodiments, MBS MAP IE can be included in the DL MAP message of a frame. Additionally, as shown in FIG. 2, frame 202 can also include an MBS MAP message that can include details (of the MBS permutation zone) such as structure, modulation and coding of MAC data bursts within the MBS permutation zone.

As shown in FIG. 2, MBS MAP can usually reside in the first data burst ($M_1$) within an MBS permutation zone. Furthermore, in some embodiments, the MBS MAP message can also include IEs that can describe individual MBS data bursts that can be present in MAC frames that are one or more frames in the future from the frame that can contain the MBS MAP message itself. For example, as shown in FIG. 2, MBS MAP message of frame 202 can include IEs that can describe individual MBS data bursts in future frame 208.

During normal operation of a network such as exemplary network 100 (from FIG. 1), in a given MBS zone, after a MS has successfully established an MBS MAC connection, the MS can begin searching the DL MAP messages of successive frames until it can find a first MBS MAP IE that can describe the location of a next MBS permutation zone for the MBS zone that the MBS MAC connection can belong to. As discussed earlier, in some embodiments, the beginning of the MBS permutation zone can include an MBS MAP message.

After an MBS MAP message that includes a data burst allocation for the applicable MBS connection is found, the MS can be provided sufficient information to locate, demodulate and decode the MBS data burst. As discussed earlier, in some embodiments, the MS can also locate a next occurrence of an MBS MAP message that can include the next occurrence of a data burst for the MBS connection. Thus, once the MS finds an MBS MAP message, it can knows how to find a next MBS MAP message.

Because a MS can daisy-chain from one MBS MAP message to the next MBS MAP message(s) pertaining to the same MBS connections, a significant savings in power can be obtained because the MS may not be required to continually monitor the DL MAP message of each frame to search for the next MBS MAP message for an applicable MBS connection.

Due to the physical properties of radio frequency (RF) propagation and the consequently induced multipath delay, a coverage area of a given MBS zone (such as exemplary MBS zones 1 and 2 of network 100) can be limited. Therefore, to enable a large geographical coverage of various MBS services, multiple MBS zones transmitting the same MBS content can be implemented. As discussed earlier, in some embodiments, it can be possible for one or more MBS zones to overlap with one another.

Figure 3:
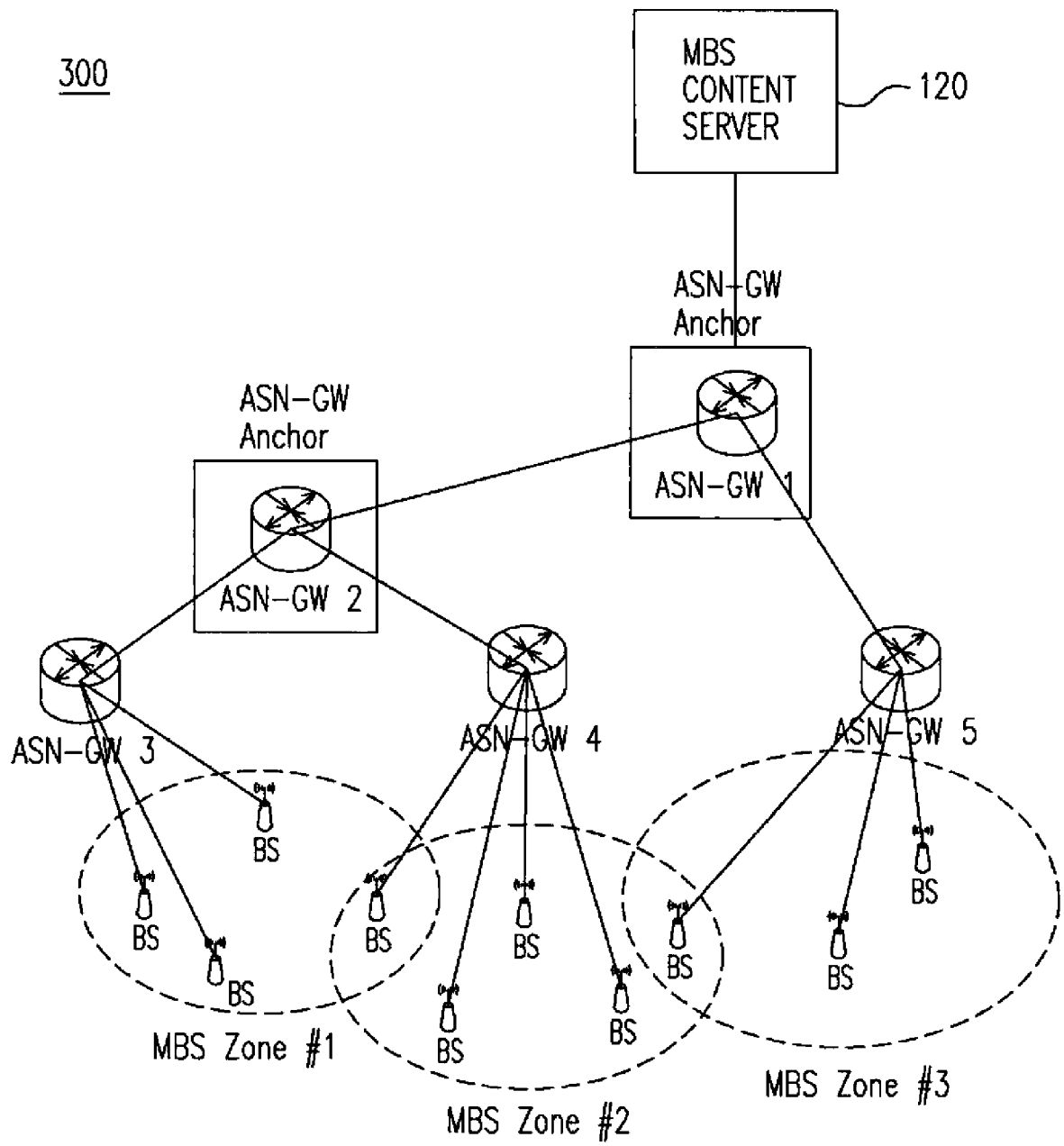
FIG. 3 illustrates another block diagram of a exemplary communication network consistent with disclosed embodiments.

FIG. 3 is a schematic illustrating an exemplary network 300 that can include multiple overlapping MBS zones. As shown in FIG. 3, network 300 can include three MBS zones such as MBS zone 1, MBS zone 2, and MBS zone 3, where MBS zone 2 partially overlaps with MBS zones 1 and 3. It should be noted that the various MBS zone discussed with respect to network 300 in FIG. 3 can be similar if not identical to the various MBS zones discussed with respect to network 100 in FIG. 1. Furthermore, the overall structure and implementation of network 300 can be similar if not identical to that of network 100 discussed with respect to FIG. 1.

As shown in FIG. 3, each MBS zone can further include one or more base stations (BS). It should be noted that the various BS's in network 300, can be similar if not identical to BS's 102, 104 and 106 discussed with respect to network 100. In a manner similar to that discussed with respect to network 100 in FIG. 1, the various BS's in a given MBS zone can be coupled to a ASN-GW. For example, as depicted in FIG. 3, the BS's of MBS zone 1, 2 and 3 can be coupled to ASN-GW 3, ASN-GW 4, and ASN-GW 5, respectively. Furthermore, as shown in FIG. 3, in some embodiments, one or more ASN-GW's can be further connected to one or more additional ASN-GW's. For example, in network 300, ASN-GW 3 and 4 can be coupled to ASN-GW 2, ASN-GW 5 can be coupled to ASN-GW 1, and ASN-GW 2 can be further coupled to ASN-GW 1. It should be noted that the various ASN-GW's depicted in network 300 can be similar if not identical to ASN-GW 116 discussed with respect to network 100 in FIG. 1.

Figure 5:
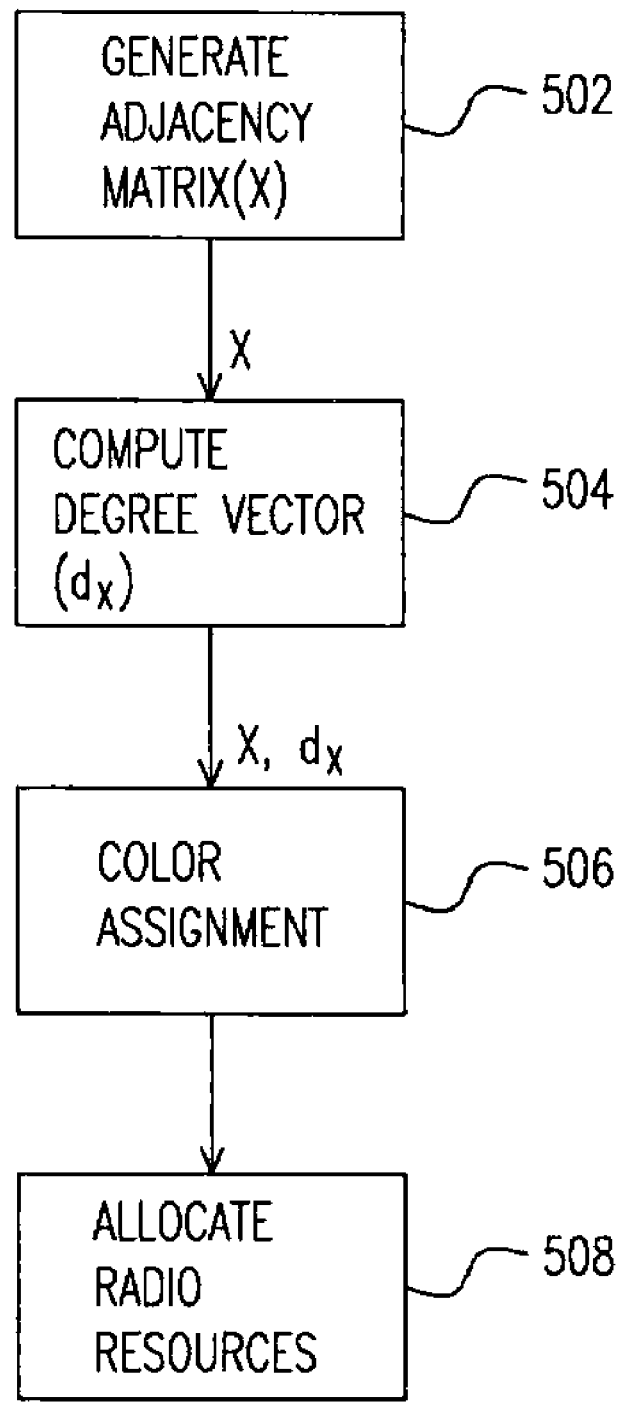
FIGS. 5 and 6 are flow diagrams illustrating a method for allocating radio resources consistent with disclosed embodiments.

In an MBS, a BS can be member of one or more MBS zones. Two MBS zones can overlap if they include at least one BS that can belong to both areas. As discussed earlier, the overlapping MBS zones must not use the same radio resource units (time, frequency, code, etc.) to deliver different MBS Bursts. In some embodiments, a coordinating scheduling function can be used to coordinate and allocate resources for MBS Burst transmissions across an entire set of the BS's that belong to one or more MBS zone Areas. FIGS. 5 and 7 discuss in detail various scheduling algorithms that are consistent with some embodiments of the present invention.

In some embodiments, a scheduling function can manage an MBS connection associated with a MS (not shown in FIG. 3) in a distributed manner (using one ASN-GW) or in a centralized manner (using one or more ASN-GW's). For example, if a MS is present within a coverage area of one or more BS's of MBS zone 1, the MBS connection of the MS can be managed by ASN-GW 3. However, if the MS moves from the coverage area of MBS zone 1 to that of MBS zone 2, the MBS connection of the same MS can now be managed by ASN-GW 2. Because, one or more ASN-GW's and/or ASN-G anchors can manage an MBS connection of a given MS, the MS may not need to re-establish an MBS connection each time it moves from one MBS zone to another. In this manner, mobility of a MS can be maintained.

Figure 4A:
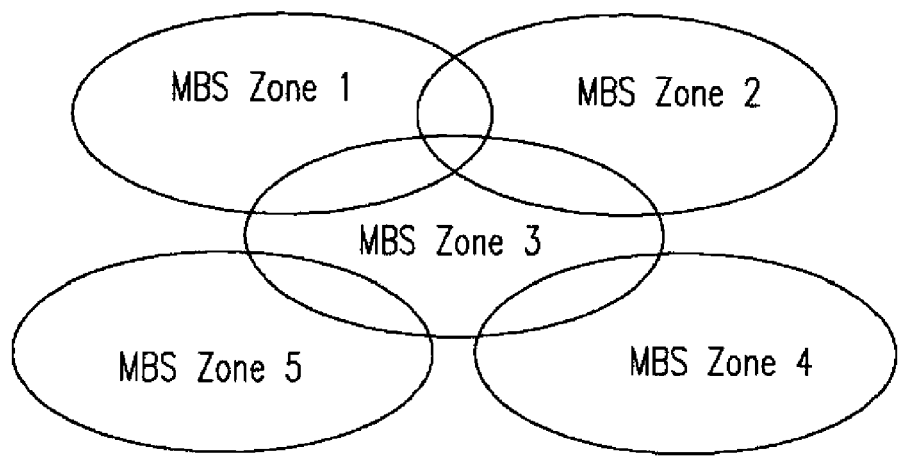
FIGS. 4a and 4b are schematics of an exemplary MBS zone topology consistent with disclosed embodiments.
Figure 4B:
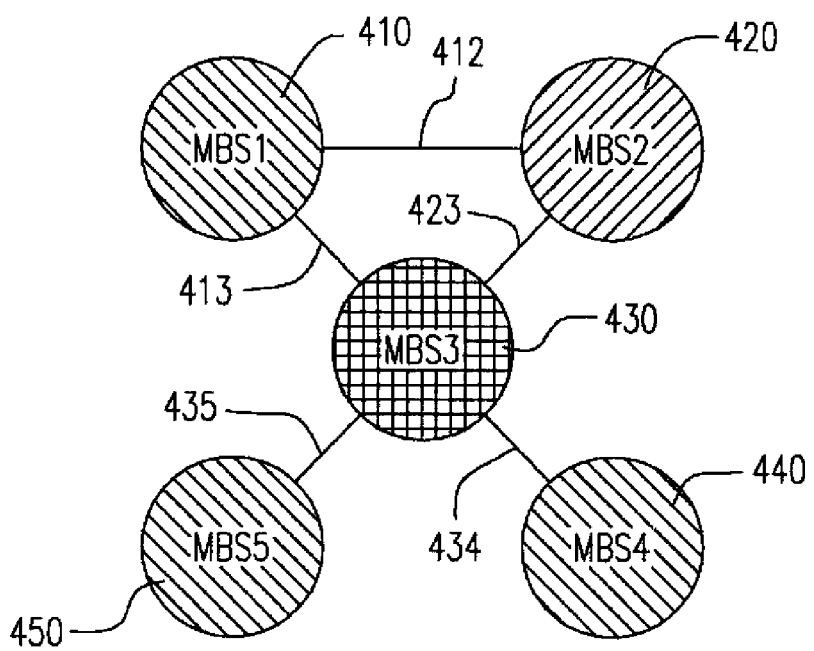

In some embodiments, in order to improve the efficiency of an MBS service, a scheduling algorithm can take into account the topology of one or more MBS zones before allocating various MBS Bursts. In some embodiments, graph theory can be used to generate an accurate model of the topology of various overlapping MBS zones. FIGS. 4a and 4b illustrate, a geographical and graphical representation, respectively, of an exemplary MBS topology consistent with some embodiments of the present invention. As is shown in FIG. 4a, network 300 can include five MBS zones 1, 2, 3, 4, and 5 where each of MBS zones 1, 2, 4, and 5 partially overlap with MBS zone 3, and MBS zones 1 and 2 also partially overlap each other.

To assist with an efficient allocation of resources between various overlapping MBS zones, a graphical model can be used to generate an accurate model of the topology of the various overlapping MBS zones. In some embodiments, a set of overlapping MBS zones can be modeled as a graph in which vertices can represent various MBS zones, and edges can represent relationships between the various vertices (MBS zones). For example, if two MBS zones overlap geographically, an edge can be drawn between the two corresponding vertices. In order to color a graph, i.e., creating a vertex colored graph, different colors can be assigned to the various vertices such that no two adjacent vertices (vertices that are connected by a edge, i.e. overlapping MBS zones) share the same color.

FIG. 4b illustrates an exemplary graphical representation 400 of the overlapping MBS zones depicted in FIG. 4a. As can be seen in FIG. 4b, MBS zones 1, 2, 3, 4, and 5 are depicted as vertices 410, 420, 430, 440, and 450, respectively. Because MBS zones 1, 2, 4, and 5 partially overlap with MBS zone 3 (as shown in FIG. 4a.) edges 413, 423, 434, and 435 can connect vertices 410, 420, 440, and 450 with vertex 430, respectively. Similarly, because MBS zones 1 and 2 partially overlap, edge 412 can connect vertex 410 and 420. Additionally, as discussed earlier, because no two adjacent vertices can share the same color, vertices 410, 420, 440, and 450 can have a different color with respect to Vertex 430, while vertex 410, 450, and 440 can have the same color with respect to each other because MBS zones 1, 5, and 4 do not overlap with one another.

Furthermore, each color can correspond to given radio resource (time, frequency) setting, such that all MBS zones that include a similar color can transmit their data at the same time using the same set of sub-channels. In other words, a transmission can overlap in both the sub-channel and timeslot dimensions. For MBS zones (vertices) that have been assigned different colors, must not transmit their data over the same subcarriers at the same time. For example, MBS zones 1, 4, and 5 can transmit data over the same set of frequency and time resources, MBS zone 2 can transmit data over a different set of frequency and time resources while MBS zone 3 can transmit data over yet another different set frequency and time resources.

FIG. 5 is a flow chart that illustrates a scheduling (coloring) algorithm 500 consistent with some embodiments of the present invention. As will be discussed below, a network can implement coloring algorithm 500 to allocate radio resources for delivering MBS bursts for a given topology of MBS zones. In some embodiments, the coloring algorithm of FIG. 5 can be implemented by a network such as exemplary network 300 in either a distributed manner (via a single ASN-GW) or a centralized manner (via one more ASN-GW's). In some embodiments, the coloring algorithm 500 can assign any one of P colors to N different MBS zones (where P≦N) where each color assignment can correspond to a specific radio (frequency and time) setting. Various BS's in an MBS zone can then transmit data to various MS's according to radio settings (color) assigned to that given MBS zone (vertex).

As is shown in FIG. 5, coloring algorithm 500 can begin in step 502 by generating a N×N adjacency matrix X where N is the number of MBS zones. Typically, any graph can be represented in matrix format by an adjacency matrix. In the context of an MBS service, an adjacency matrix such as exemplary matrix X can represent a relationship between the N various MBS zone areas in a network such as exemplary network 300.

Each element $x_{i,j}$ the i-th row (where i=1, 2, . . . , N) and the j-th column (where j=1, 2, . . . , N) of matrix X can be calculated as:

$$x_{i,j} = \begin{cases} 1, & \text{if } MBS \text{ Zone Area } i \text{ and} \\ & MBS \text{ Zone Area } j \text{ is overlapped,} \\ 0, & \text{otherwise.} \end{cases} \quad (1)$$

In some embodiments, in step 502, elements $x_{i,i}$ can be initialized as $$x_{i,i}=0, \text{ for } i \in \{1,N\}. \quad (2)$$

Furthermore, in some embodiments, in order to reduce computational complexity, and because matrix X is an adjacency matrix, $x_{i,j}=x_{j,i}$. For example, matrix X for the MBS zone topology illustrated in FIG. 4a (and graph 400 of FIG. 4b), can be generated as:

$$X = \begin{bmatrix} 0 & 1 & 1 & 0 & 0 \\ 1 & 0 & 1 & 0 & 0 \\ 1 & 1 & 0 & 1 & 1 \\ 0 & 0 & 1 & 0 & 0 \\ 0 & 0 & 1 & 0 & 0 \end{bmatrix} \quad (3)$$
$$\begin{matrix} \downarrow & \downarrow & \downarrow & \downarrow & \downarrow \\ 1 & 2 & 3 & 4 & 5 \end{matrix}$$

*MBS zones*

After adjacency matrix X has been generated, in step 504, a degree vector $d_X = [d_1\ d_2\ d_3\ \ldots\ d_N]$ of matrix X can be calculated. Typically, a degree vector can represent the number of edges connected to a given vertex and each element $d_i$ of the degree vector can be calculated as:

$$d_i = \sum_{j=1}^{N} x_{i,j} \quad (4)$$

In some embodiments, degree vector $d_X = [d_1\ d_2\ d_3\ \ldots\ d_N]$ of matrix X can also be calculated as:

$$d_i = \sum_{j=1}^{N} \delta(x_{i,j}), \text{ where } \delta(x_{i,j}) = \begin{cases} 1 & \text{if } x_{i,j} \neq 0 \\ 0, & \text{otherwise} \end{cases} \quad (5)$$

For example, a degree vector of matrix X (associated with graph 400) from equation 3 can be calculated as:

$$d_X = [2\ 2\ 4\ 1\ 1] \quad (6)$$

As can be seen from equation 6, degree vector $d_X$ can represent the number of edges associated with each of the vertices of graph 400, i.e. equation 6 represents the number of MBS zones that each MBS zone (of FIG. 4a) overlaps with. For example, from equation 6, it can be easily verified that MBS zone 1 overlaps with two other MBS zones (MBS zones 2 and 3), MBS zone 3 overlaps with four MBS zones (MBS zones 1, 2, 4, and 5) etc.

After adjacency matrix X and degree vector $d_X$ are calculated, in step 506 each vertex (MBS zone) can be assigned a color. A color assignment method that can be implemented in step 506 is discussed in detail below with respect to FIG. 6. As discussed earlier, after a color has been assigned to an MBS zone, in step 508, radio resources can be allocated to each MBS zone based on a corresponding color assignment i.e. BS's within an MBS zone can transmit data to various MS's using specific radio setting (color) assigned to that particular MBS zone.

Figure 6:
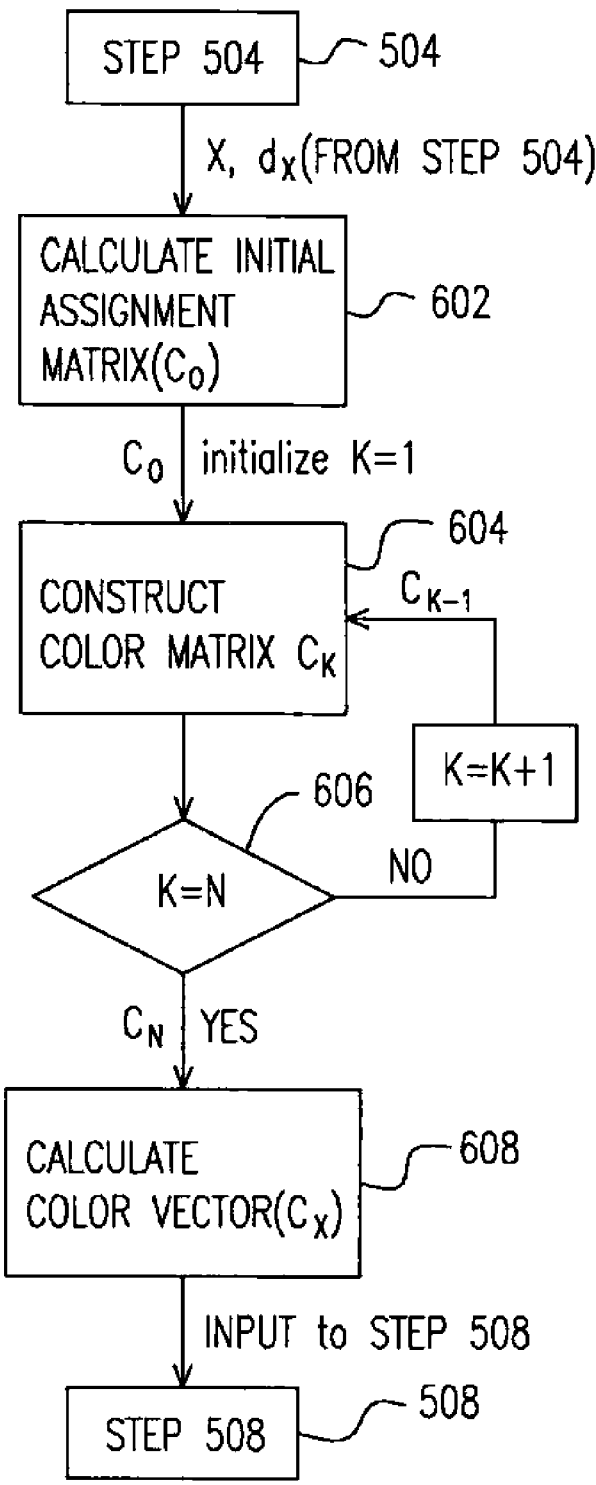

FIG. 6 is a flow chart illustrating in a method for assigning color performed during step 506 of coloring algorithm 500 consistent with some embodiments of the present invention. As shown in FIG. 6, in step 602, an initial assignment matrix $C_0$ can be calculated such that:

$$C_0 = -1 \cdot X \quad (7)$$

For example, from equations 3 and 7, assignment matrix $C_0$ for exemplary graph 400 illustrated in FIG. 4a can be expressed as:

$$C_0 = -X = \begin{bmatrix} 0 & -1 & -1 & 0 & 0 \\ -1 & 0 & -1 & 0 & 0 \\ -1 & -1 & 0 & -1 & -1 \\ 0 & 0 & -1 & 0 & 0 \\ 0 & 0 & -1 & 0 & 0 \end{bmatrix} \quad (8)$$

As discussed earlier with respect to FIG. 5, any one of P (where $P \leq N$) different colors (1, 2, ..., P) can be assigned to the N various vertices (MBS zones). As shown in FIG. 6, a counter k (where $k \leq N$) can be initialized to. In step 604, for a given MBS zone $n(n \in \{1, N\})$ a color 1 can be assigned to MBS zone n i.e. element $c_{n,n} = 1$ if MBS zone n can include a maximum degree such that:

$$d_n = \underset{i}{\operatorname{argmax}} d_i,\ 1 \leq i \leq N,\ d_i \in \overline{d_x} \quad (9)$$

Furthermore, a color matrix $C_1 (C_k$ when k=1) can be computed from the elements of assignment matrix $C_0$ such that:

$$\begin{cases} c_{i,n} = c_{n,n}, & \text{if } c_{i,n} = -1,\ i \in \{1, N\}, \\ c_{n,j} = c_{n,n}, & \text{if } c_{n,j} = -1,\ j \in \{1, N\}. \end{cases} \quad (10)$$

For example, from equations 8, 9, and 10, color matrix $C_1$ for exemplary graph 400 illustrated in FIG. 4a can be expressed as:

$$d_3 = \underset{i}{\operatorname{argmax}} d_i,\ 1 \leq i \leq 5,\ d_i \in \overline{d_x} \quad (11)$$

and $$C_1 = \begin{bmatrix} 0 & -1 & 1 & 0 & 0 \\ -1 & 0 & 1 & 0 & 0 \\ 1 & 1 & 1 & 1 & 1 \\ 0 & 0 & 1 & 0 & 0 \\ 0 & 0 & 1 & 0 & 0 \end{bmatrix} \text{ when } c_{3,3} = 1, \quad (12)$$

In step 606, if $k \neq N$ (step 606—No), then k can be incremented by 1 and in step 604, a used color can be assigned to an MBS zone $m(m \in \{1, N\})$ i.e. $c_{m,m} = 1$ if uncolored MBS zone m can include a maximum degree such that:

$$d_m = \underset{i}{\operatorname{argmax}} d_i,\ 1 \leq i \leq N,\ i \neq n,\ d_i \in d_x \quad (13)$$

and, MBS zone m does not include a neighbor vertex (MBS zone) that has been assigned a used color. Furthermore, in step 606, a second color matrix $C_2 (C_k$ when k=2) can be computed by replacing corresponding elements in first color matrix $C_1$ such that:

$$\begin{cases} c_{i,m} = c_{m,m}, & \text{if } c_{i,m} = -1,\ i \in \{1, N\}, \\ c_{m,j} = c_{m,m}, & \text{if } c_{m,j} = -1,\ j \in \{1, N\}. \end{cases} \quad (14)$$

For example, from equations 12, 13, and 14, second color matrix $C_2$ for exemplary graph 400 illustrated in FIG. 4a can be expressed as:

$$d_1 = d_2 = \underset{i}{\operatorname{argmax}} d_i, \ 1 \le i \le N, \ i \ne 3, \ d_i \in \overline{d_x} \quad (15)$$

and $$C_2 = \begin{bmatrix} 2 & 2 & 1 & 0 & 0 \\ 2 & 0 & 1 & 0 & 0 \\ 1 & 1 & 1 & 1 & 1 \\ 0 & 0 & 1 & 0 & 0 \\ 0 & 0 & 1 & 0 & 0 \end{bmatrix} \text{ when } c_{1,1} = 2, \quad (16)$$

As shown in FIG. 6, steps 606 and 604 can be repeated until all vertices are colored i.e. until the condition $c_{i,i} \ne 0$, $i \in \{1,N\}$ is satisfied and a Nth color matrix $C_N$ is computed in a manner similar to that discussed with respect to step 606. Additionally, a given color p can be assigned to a given MBS zone q (i.e.) $c_{q,q} = p$ if the following condition is satisfied:

$$\begin{cases} c_{q,q} \ne c_{i,q}, & \text{if } c_{i,q} \ne 0 \text{ or } -1, \ i \in \{1, N\}, \\ c_{q,q} \ne c_{q,j}, & \text{if } c_{q,j} \ne 0 \text{ or } -1, \text{ for } j, \in \{1, N\}. \end{cases} \quad (17)$$

Furthermore, in step 604, through each iteration of step (606—No), each kth color matrix (where $1 \le k \le N$) can replace a k−1th color matrix such that:

$$\begin{cases} c_{i,q} = c_{q,q}, & \text{if } c_{i,q} = -1, \ i \in \{1, N\}, \\ c_{q,j} = c_{q,q}, & \text{if } c_{q,j} = -1, \ j \in \{1, N\}. \end{cases} \quad (18)$$

Finally, in step 608, a color vector $c_X$ can be computed from Nth color matrix $C_N$, such that:

$$c_X = [c_{1,1} c_{2,2} c_{3,3} \ldots C_{N,N}] \quad (19)$$

where $c_{1,1}$ represents the color assigned to MBS zone 1, $c_{2,2}$, represents the color assigned to MBS zone 2, $c_{N,N}$ is the color assigned to MBS zone N etc. For example, through one or more iterations of step (606—No), equations 17, 18, and 19, color matrix $C_N$ and color vector $c_X$ for exemplary graph 400 illustrated in FIG. 4a can be expressed as:

$$C_3 = \begin{bmatrix} 2 & 2 & 1 & 0 & 0 \\ 2 & 3 & 1 & 0 & 0 \\ 1 & 1 & 1 & 1 & 1 \\ 0 & 0 & 1 & 0 & 0 \\ 0 & 0 & 1 & 0 & 0 \end{bmatrix}, \text{ for } k = 3 \quad (20)$$

$$C_4 = \begin{bmatrix} 2 & 2 & 1 & 0 & 0 \\ 2 & 3 & 1 & 0 & 0 \\ 1 & 1 & 1 & 1 & 1 \\ 0 & 0 & 1 & 2 & 0 \\ 0 & 0 & 1 & 0 & 0 \end{bmatrix}, \text{ for } k = 4 \quad (21)$$

$$C_5 = \begin{bmatrix} 2 & 2 & 1 & 0 & 0 \\ 2 & 3 & 1 & 0 & 0 \\ 1 & 1 & 1 & 1 & 1 \\ 0 & 0 & 1 & 2 & 0 \\ 0 & 0 & 1 & 0 & 2 \end{bmatrix}, C_N \text{ (where } k = N = 5\text{)} \quad (22)$$

$$c_x = [2 \ 3 \ 1 \ 2 \ 2] \quad (24)$$

Therefore, as can be seen from equation 24, the topology of the MBS zones represented by graph 400 can be modeled using three different color assignments where MBS zones 1, 4 and 5 can be assigned the same color (such as color 2), MBS zone 2 can be assigned a different color (such as color 3) and MBS zone 3 can be assigned yet another color (such as color 1).

In some embodiments, if at a particular transmission period, a certain MBS zone may not have enough traffic in order to fill the colored region assigned to it, in which case it may use the remaining resource (i.e. time and frequency) for transmitting non-MBS traffic. Furthermore, radio resources for each MBS zone can pre-assigned i.e. color algorithm 500 can be calculated off-line for a fixed MBS zone topology and the resulting colored regions can be manually configured in the corresponding Base Stations.

Figure 7A:
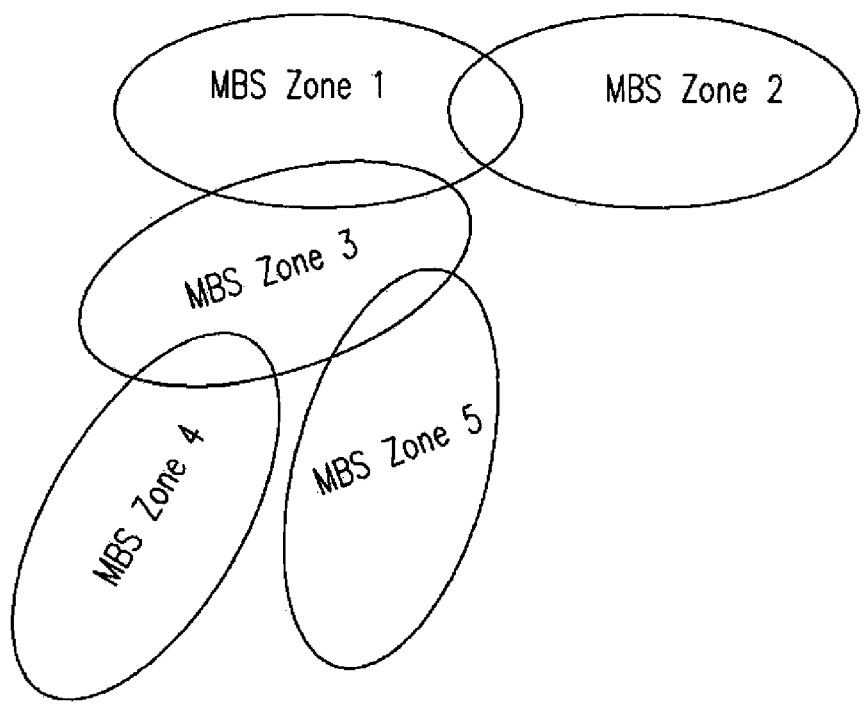
FIGS. 7a and 7b are schematics of another exemplary MBS zone topology consistent with disclosed embodiments.

In some embodiments, in an attempt to further improve the efficiency of an MBS service in a varying MBS zone topology, various radio resources can be dynamically shared between various MBS zones for exchange of MBS traffic. In a manner similar to that discussed with respect to FIGS. 4a and 4b, FIGS. 7a and 7b illustrate, a geographical and graphical representation, respectively, of an exemplary MBS zone topology (that represents a change MBS zone topology of FIGS. 4a and 4b). As shown in FIG. 7a, each of MBS zones 1, 4, and 5 partially overlap with MBS zone 3, and MBS zones 1 and 2 also partially overlap each other.

Figure 8:
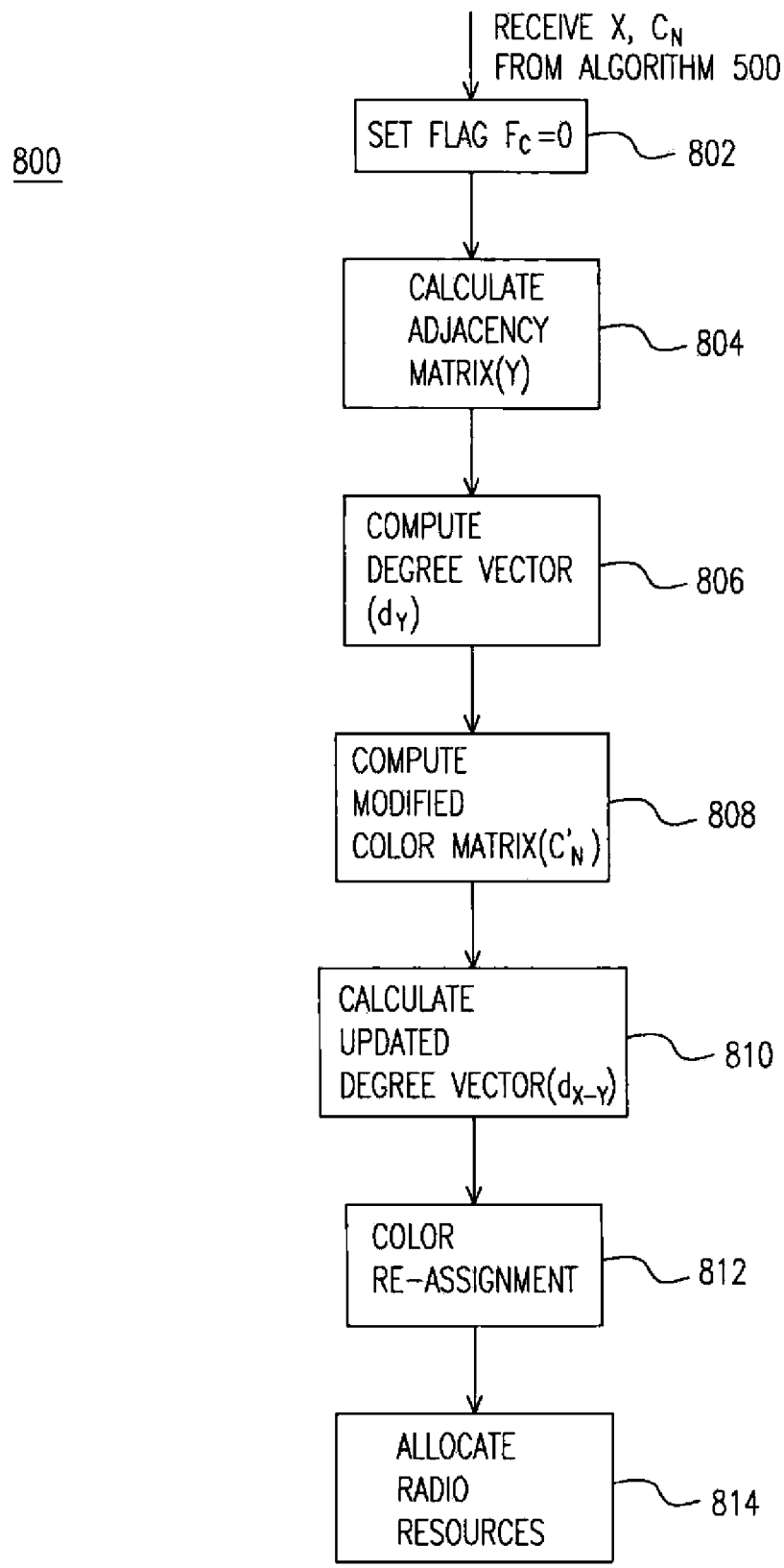
FIGS. 8 and 9 are flow diagrams illustrating another method for allocating radio resources consistent with disclosed embodiments.

FIG. 8 is a flow chart illustrating a re-coloring algorithm 800 consistent with some embodiments of the present invention. In a manner similar to that discussed with respect to FIG. 5, a network can implement re-coloring algorithm 800 to dynamically re-calculate and re-color the various MBS zones i.e. radio resources assigned to the various MBS zones after the operation of coloring algorithm 500 can be re-assigned by re-coloring algorithm 800. Furthermore, the resulting assignment of the colored regions can be distributed among all BS's that belong to the corresponding MBS zones.

Figure 7B:
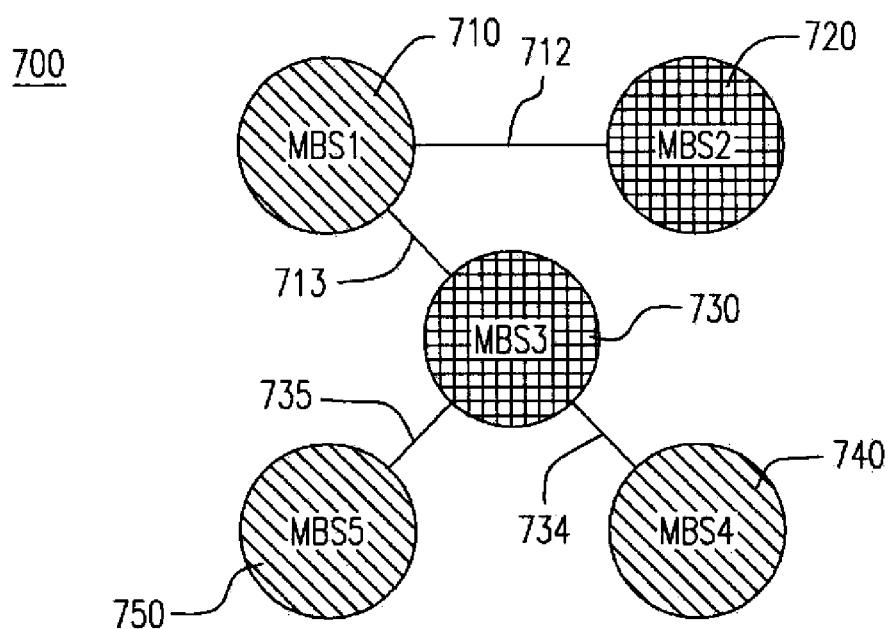

As an example, the implementation of re-coloring algorithm 800 will be described in context with the MBS zone topology illustrated in FIGS. 7a and 7b. Furthermore, in an attempt to explain a dynamic allocation of resources by algorithm 800, it is assumed that the MBS zone topology changes from the topology illustrated in FIGS. 4a and 4b (implementation of coloring algorithm 500) to the topology illustrated in FIGS. 7a and 7b. However, coloring algorithm 500 and re-coloring algorithm 800 can be implemented for any type of MBS zone topology.

As shown in FIG. 8, re-coloring algorithm 800 can begin in step 802 where adjacency matrix X calculated from coloring algorithm 500 can be received and a color reduction flag $F_C$ can be set initially, such as, $F_C = 0$. In some embodiments, color reduction flag $F_C$ can include a value of 0 or 1, where $F_C = 1$ if any edges are removed from a current adjacency matrix in comparison with a previous adjacency matrix, and $F_C = 0$ otherwise.

In step 804, in a manner similar to that discussed with respect to step 502 in FIG. 5, an adjacency matrix Y can be calculated such that each element $y_{i,j}$ can equal:

$$y_{i,j} = \begin{cases} 1, & \text{if MBS Zone } i \text{ and MBS Zone } j \text{ is overlapped,} \\ 0, & \text{otherwise.} \end{cases} \quad (25)$$

In some embodiments, adjacency matrix Y can represent a topology of MBS zones that may be different from the MBS zone topology discussed with respect to FIG. 5. For example, matrix Y for the MBS zone topology illustrated in FIG. 7a (and graph 700 of FIG. 7b), can be generated as:

$$Y = \begin{bmatrix} 0 & 1 & 1 & 0 & 0 \\ 1 & 0 & 0 & 0 & 0 \\ 1 & 0 & 0 & 1 & 1 \\ 0 & 0 & 1 & 0 & 0 \\ 0 & 0 & 1 & 0 & 0 \end{bmatrix}, \quad (26)$$

In step 806, in a manner similar to that discussed with respect to step 504 in FIG. 5, a degree vector $d_Y$ can be calculated in, such that:

$$di = \sum_{j=1}^{N} y_{i,j} \quad (27)$$

In a manner similar to that discussed with respect to equation 6, degree vector $d_Y$ can represent the number of number of MBS zones that each MBS zone overlaps with. For example, a degree vector of matrix Y (associated with graph 700) from equation 26 can be calculated as:

$$d_Y = [2\ 1\ 3\ 1\ 1] \quad (28)$$

As can be seen from equation 28, degree vector $d_Y$ can represent the number of edges associated with each of the vertices of graph 700, i.e. equation 28 can represent the number of MBS zones that each MBS zone (of FIG. 7a) overlaps with. For example, from equation 28, it can be easily verified that MBS zone 1 overlaps with two other MBS zones (MBS zones 2 and 3), MBS zone 3 overlaps with three MBS zones (MBS zones 1, 4, and 5) etc.

As can be seen in FIG. 8, in step 808 a modified color matrix $C'_N$ can be calculated from color matrix $C_N$, received from coloring algorithm 500, such that:

$$C'_N = C_N + k \cdot (X - Y) \quad (29)$$

where k is a given constant no less than N.

For example, from equation 29, modified color matrix $C'_N$ for exemplary graph 700 illustrated in FIG. 7a can be expressed as:

$$C'_5 = C_5 + (X - Y) \times 5 = \begin{bmatrix} 2 & 2 & 1 & 0 & 0 \\ 2 & 3 & 6 & 0 & 0 \\ 1 & 6 & 1 & 1 & 1 \\ 0 & 0 & 1 & 2 & 0 \\ 0 & 0 & 1 & 0 & 2 \end{bmatrix}, \text{ i.e., } k = N = 5 \quad (30)$$

where, $$C_5 = \begin{bmatrix} 2 & 2 & 1 & 0 & 0 \\ 2 & 3 & 1 & 0 & 0 \\ 1 & 1 & 1 & 1 & 1 \\ 0 & 0 & 1 & 2 & 0 \\ 0 & 0 & 1 & 0 & 2 \end{bmatrix} \text{ (from equation 22),}$$

and $$X - Y = \begin{bmatrix} 0 & 0 & 0 & 0 & 0 \\ 0 & 0 & 1 & 0 & 0 \\ 0 & 1 & 0 & 0 & 0 \\ 0 & 0 & 0 & 0 & 0 \\ 0 & 0 & 0 & 0 & 0 \end{bmatrix}$$

After modified color matrix $C'_N$ is calculated, in step 810, a difference degree vector $d_{X-Y}$ can be calculated from the X-Y component of equation 30. In some embodiments, difference degree vector $d_{X-Y}$ can indicate the updated MBS zone topology in a manner such that all non-zero positive elements of vector $d_{X-Y}$ can indicate an addition of a new edge to the corresponding vertex (MBS zone), while all non-zero negative elements of vector $d_{X-Y}$ can indicate a deletion of a edge from the corresponding vertex. Therefore, difference degree vector $d_{X-Y}$ can identify any number V (where V≦N) MBS zones that are updated i.e. need to be re-colored. For example, a difference degree vector $d_{X-Y}$ (associated with graph 700) can be calculated as:

$$d_{X-Y} = [0\ 1\ 1\ 0\ 0] \quad (31)$$

As can be seen from equation 31, difference degree vector $d_{X-Y}$ indicates that new edges have been added to MBS zones 2 and 3. Therefore, (V=2) MBS zones 2 and 3 have been updated i.e. need to be re-colored.

Once updated MBS zones i.e. MBS zones that either added and/or deleted an edge are identified from $d_{X-Y}$ (in step 810), then in step 812, a color re-assignment method can take place to re-color the various updated MBS zones. A color-re-assignment method consistent with some embodiments of the present invention is described in detail below with respect to FIG. 9. As will be discussed in detail with respect to FIG. 9, the output of step 812 can be a color vector $c_Y$. Furthermore, in a manner similar to that discussed with respect to FIG. 5, in step 814, BS's within a MBS zone can transmit data to various MS's according to the color (radio setting) assigned in color vector $c_Y$ corresponding to that particular MBS zone.

Figure 9:
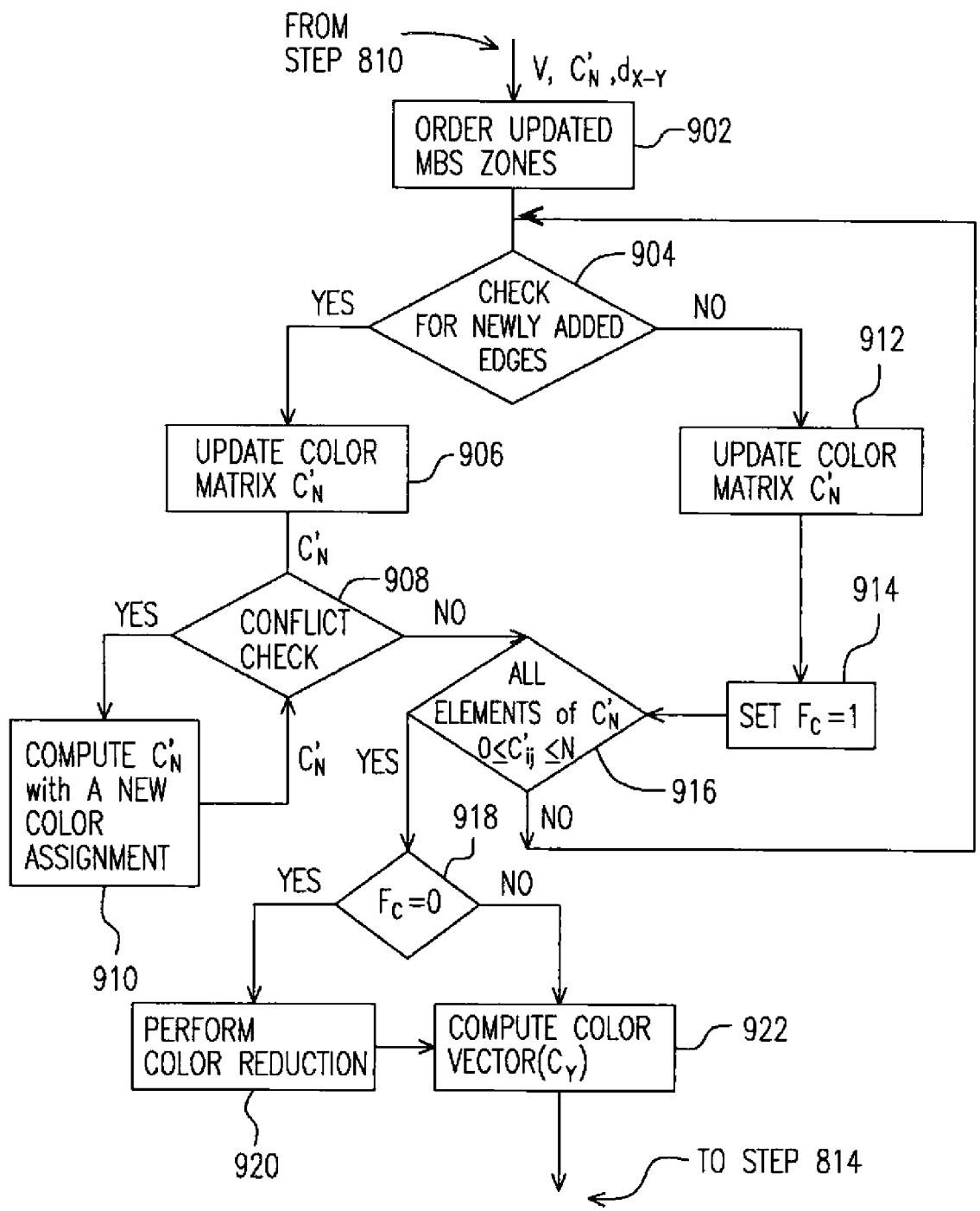

As mentioned earlier, FIG. 9 is a flow chart illustrating a method for re-assigning color performed during step 812 of re-coloring algorithm 800 consistent with some embodiments of the present invention. As shown in FIG. 9, in step 902, identified V number of updated MBS zones can be arranged in order of their maximum corresponding values in degree vector $d_Y$ such that, for a $m^{th}$ updated MBS zone, $$d_m = \operatorname*{argmax}_i d_i,\ 1 \le i \le N,\ d_i \in \overline{d_y}. \quad (32)$$

Once the V different updated MBS zones are arranged in the order as specified in equation 32, in step 904, a $m^{th}$ updated MBS zone can be checked to identify if the given $m^{th}$ updated MBS zone includes one or more added or subtracted edges. In some embodiments, the following elements of modified color matrix $C'_N$ can be checked in step 904:

$$c'_{m,i} < 0\ or\ c'_{j,m} < 0, 1 \le i,j \le N, \quad (33)$$

If the condition of equation 33 is satisfied (step 904—Yes), then in step 906, elements of color matrix $C'_N$ can be updated as:

$$\begin{cases} c_{m,i} = c_{m,m}, & \text{if } c_{m,i} < 0,\ i, m \in \{1, N\}, \\ c_{j,m} = c_{m,m}, & \text{if } c_{j,m} < 0,\ j, m \in \{1, N\}. \end{cases} \quad (34)$$

After the elements of color matrix $C'_N$ can be updated according to the condition in equation 34, in step 908, a check can be made to identify if changes made during step 906 can result in a conflict. In some embodiments, the $m^{th}$ updated MBS zone can be checked with any $n^{th}$ MBS zone to identify if the following condition is satisfied or not:

$$c_{n,n} = c_{m,m}\ \text{and}\ c_{n,m} \ne 0. \quad (35)$$

If the condition of equation 35 is satisfied (step 908—Yes), then in step 910, a new color can be assigned to the $n^{th}$ MBS zone and elements of color matrix $C'_N$ can be further updated. If the condition of equation 35 is not satisfied (step 908—no), then the method can proceed to step 916. If the condition of equation 33 is not satisfied (step 904—No), then in step 912, elements of color matrix $C'_N$ can be updated as shown in equation 36, and in Step 914, the color flag can be set as $F_C=1$:

$$c'_{i,m}=0 \text{ or } c'_{m,j}=0, 1 \leq i \leq N, 1 \leq j \leq N \quad (36)$$

In step 916, the elements of color matrix $C'_N$ can be checked to see if the following condition is met:

$$0 \leq c'_{i,j} \leq N, 1 \leq i \leq N, 1 \leq j \leq N \quad (37)$$

If the condition of equation 37 not satisfied (step 916—No), then the method can loop back to step 904 and the above mentioned steps can be repeated for a new $m^{th}$ updated MBS zone If the condition of equation 37 is satisfied (step 916—Yes), then in step 918, the color flag can be checked. If in step 918, the color flag $F_C=0$ (step 918—Yes), then the method can proceed to step 922. If in step 918, the color flag $F_C=1$ (step 918—No), then in step 920 a color reduction procedure can be performed to optimize the number of colors that can be used within the current MBS zone topology.

In step 922, a color vector $c_Y$ can be derived from the updated color matrix $C'_N$, such that:

$$c_Y = \text{diag}(C'_N). \quad (38)$$

Therefore, in a manner similar to that discussed with respect to color vector $c_X$ in FIG. 6, the elements of color vector $c_Y$ can correspond to the color assignments for the various MBS zones.

Figure 10:
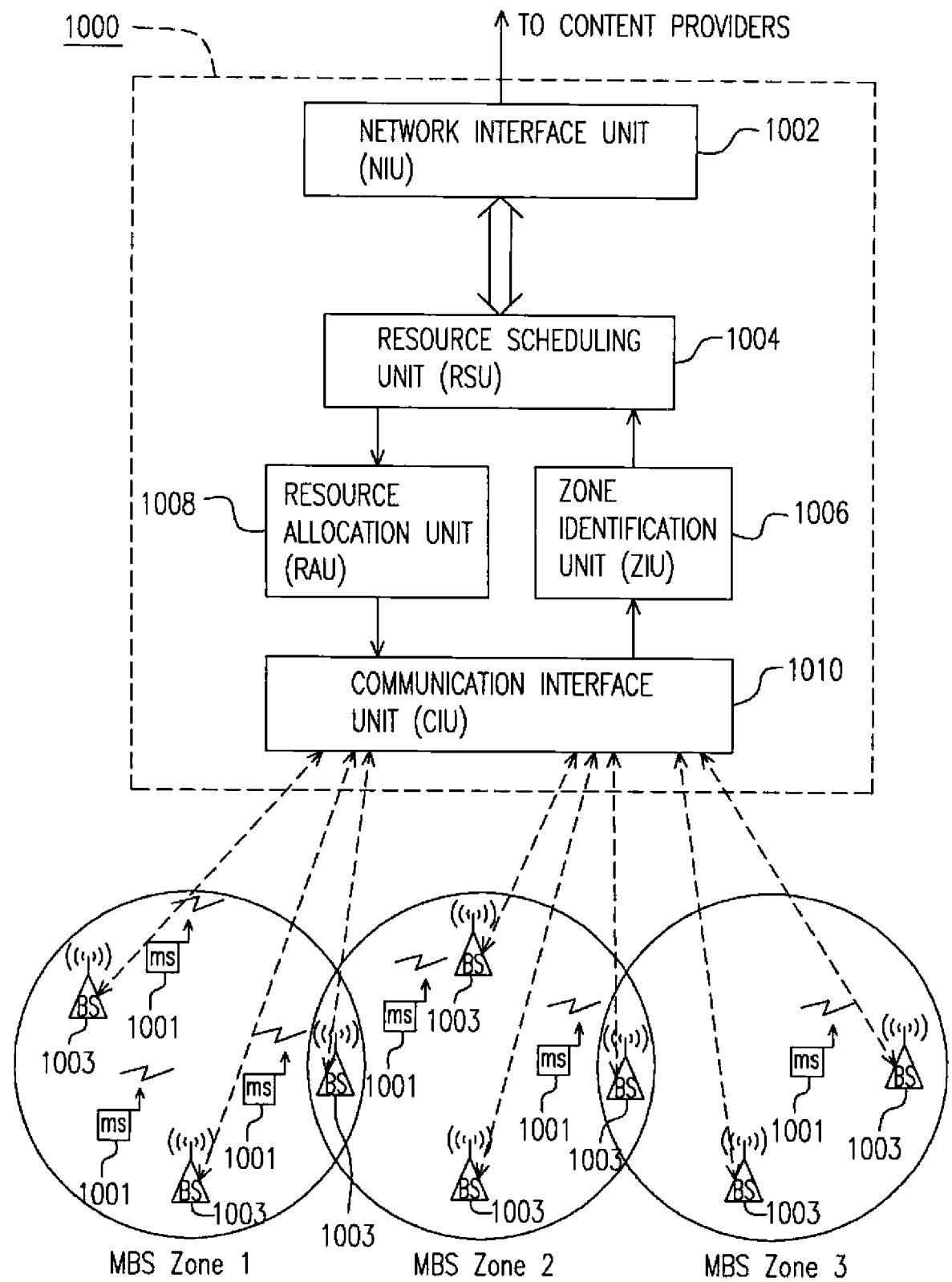
FIG. 10 is a flow diagrams illustrating yet another method for allocating radio resources consistent with disclosed embodiments.

FIG. 10 illustrates a exemplary functional block diagram of a communication system 1000 consistent with the disclosed embodiments. As an example, a communication system can implement one or more resource allocation techniques consistent with the disclosed embodiments. The various functional units depicted in FIG. 10, individually or in any combinations, may be implemented in hardware, in software executed on one or more hardware components (such as one or more processors, one or more application specific integrated circuits (ASIC's) or other such components), or in a combination of hardware and software.

As illustrated in FIG. 10, system 1000 can include a Resource Scheduling unit (RSU) 1004 that can be coupled to a Network Interface unit (NIU) 1002 and can receive via (NIU 1002) content (such as from one or more content providers; can be any form of data) to be provided to one or more mobile stations, such as exemplary MS's 1001. As discussed earlier and illustrated in FIGS. 1 and 3, a network implementing a system such as exemplary system 1000 can operate with one or more overlapping and/or non-overlapping broadcast zones, such as exemplary MBS zones 1, 2 and 3. Each broadcast zone can include one or more MS's, such as exemplary MS's 1001. RSU 1004 can be further configured to schedule one or more communication resources (such as time, frequency, etc.) such that each MBS zone can broadcast separate contents without any signal interference, while making desirable or efficient use of available network resources. As mentioned earlier, various communication resources can be scheduled across MBS zones 1, 2 and 3 in a central and/or distributed manner. Therefore, in some embodiments, it may be possible for one or more RSU's such as exemplary RSU 1004 to schedule resources across one or more of MBS zones 1, 2 and 3.

As shown in FIG. 10, RSU 1004 can be coupled to a Zone Identification unit (ZIU) 1006. ZIU 1006 can be further coupled to various base stations (BS's) such as exemplary BS's 1003, via a communication interface unit (CIU) 1010, and ZIU 1006 can be configured to identify if an MBS zone (Such as MBS zones 1, 2, and 3) overlaps with one or more MBS zones. As shown in FIG. 10, RSU 1004 can be coupled to a Resource Allocation unit (RAU) 1008. RAU 1008 can be coupled to BS's 1003 via CIU 1010, and RAU 1008 can be configured to assign various communication resources to BS's 1003 (via CIU 1010) such that each BS can transmit content according to its assigned communication resource(s).

During normal operation of system 1000, various coloring and re-coloring algorithms such as algorithms 500 and 800 can be implemented by RSU 1004 to provide a broadcast to MS's 1001 in MBS zones 1, 2, and 3. For example, during normal operation of system 1000, RSU 1004 can receive information regarding a relationship between MBS zones 1, 2, and 3 via ZIU 1006. Based on the relationship between MBS zones 1, 2, and 3, RSU 1004 can compute a desirable or efficient allocation of communication resources. In some embodiments, RSU 1004 can compute resource allocation such that MBS zones that do not overlap can be allocated the same resources while MBS zones that overlap can be allocated different resources. For example, in the scenario depicted in FIG. 10, MBS zones 1 and 3 can be allocated the same communication resources(s) while MBS zone 2 can be allocated different communication resources.

Other embodiments will be apparent to those skilled in the art based on the disclosed embodiments. Various modification may be made to the systems or methods in the disclosed embodiments. The specification and examples are exemplary only, with a true scope and spirit of the invention being indicated by the following claims.

What is claimed is:

1. A communication method for providing resource allocation in a communication network, the method comprising:
    identifying at least two broadcast zones for receiving broadcast services in the communication network;
    generating a first index based on a relative relationship among the at least two broadcast zones, the first index including information indicative of whether a first broadcast zone overlaps with at least one other broadcast zone;
    generating a second index based on the relative relationship among the at least two broadcast zones, the second index including information indicative of a number of broadcast zones overlapped with the first broadcast zone;
    assigning at least one identifier to each of the at least two broadcast zones based on the first index and the second index, each identifier being associated with at least one communication resource, with distinct identifiers being assigned to overlapping broadcast zones of the at least two broadcast zones; and
    enabling data transmissions to the at least two broadcast zones based on the assigned identifiers and using the at least one communication resource associated with the identifiers.

2. The method of claim 1, wherein assigning the at least one identifier to each of the at least two broadcast zones further comprises:
    assigning a first broadcast zone and a second broadcast zone with one single identifier if the first and the second broadcast zones do not overlap; and enabling the data transmissions to the first broadcast zone and the second broadcast zones using same communication resource.

3. The method of claim 1, wherein enabling data transmissions to the at least two broadcast zones based on the assigned identifiers comprises identifying at least one base station for each of the at least two broadcast zones, the at least one base station being configured to transmit data using the at least one communication resource associated with the assigned identifier corresponding to a broadcast zone the base station is in.

4. The method of claim 1, wherein the at least two broadcast zones comprise at least two multicast and broadcast (MBS) zones and the at least one communication resource comprises at least one of a at least one designated frequency channel for data communication and at least one designated time slot.

5. The method of claim 1, further comprising generating one combined index reflective of the information indicated by the first index and the information indicated by the second index.

6. The method of claim 1, wherein generating the first index further comprises generating the first index as a first matrix, the first matrix including a plurality of matrix elements, each of the plurality of matrix elements corresponding to two of the at least two broadcast zones, the plurality of elements comprising a first value if the two corresponding broadcast zones overlap and a second value if the two corresponding broadcast zones do not overlap.

7. The method of claim 6, wherein generating the second index further comprises generating the second index as a first degree vector, the first degree vector including a plurality of vector elements, each of the plurality of vector elements being computed by summing the matrix elements of each column of the first matrix.

8. The method of claim 1, wherein assigning at least one identifier to each of the at least two broadcast zones based on the first index and the second index further comprises:
generating a second matrix, the second matrix including a plurality of matrix elements derived by multiplying elements of the first index with −1;
assigning a first identifier of the at least one identifier to elements in a first column of the second matrix, the first column corresponding to a element in the second index having a maximum value;
assigning a second identifier of the at least one identifier to elements in a second column of the second matrix, the second column corresponding to a column having a second largest value in the second index.

9. The method of claim 8, further comprising assigning the first identifier to elements of the second column if the elements of the second column correspond to broadcast zones that do not overlap.

10. A communication method for providing resource allocation in a communication network, the method comprising:
identifying at least two broadcast zones for receiving broadcast services in the communication network;
generating a first index based on a relative relationship among the at least two broadcast zones, the first index including information indicative of whether a first broadcast zone overlaps with at least one other broadcast zone;
generating a second index based on the relative relationship among the at least two broadcast zones, the second index including information indicative of a number of broadcast zones overlapped with the first broadcast zone;
assigning at least one identifier to each of the at least two broadcast zones based on the first index and the second index, each identifier being associated with at least one communication resource, with distinct identifiers being assigned to overlapping broadcast zones of the at least two broadcast zones;
enabling data transmissions to the at least two broadcast zones based on the assigned identifiers and using the at least one communications resource associated with the identifiers;
updating the first index, when a variation to one of the at least two broadcast zones occurs, based on the relative relationship among the at least two broadcast zones, the updated first index including the information indicative of whether the first broadcast zone overlaps with at least one other broadcast zone;
re-assigning the at least one identifier to each of the at least two broadcast zones if the updated first index is different from the first index; and
enabling the data transmissions to the at least two broadcast zones based on the identifiers and using the at least one communications resource associated with the identifiers.

11. The method of claim 10, wherein assigning the at least one identifier to each of the at least two broadcast zones comprises:
assigning a first broadcast zone and a second broadcast zone with one single identifier if the first and the second broadcast zones do not overlap; and
enabling the data transmissions to the first and second broadcast zones using a same communication resource.

12. The method of claim 10, wherein enabling data transmissions to the at least two broadcast zones based on the assigned identifiers comprises identifying at least one base station for each of the at least two broadcast zones, the at least one base station being configured to transmit data using the at least one communication resource associated with the assigned identifier corresponding to a broadcast zone the base station is in.

13. The method of claim 10, wherein the at least two broadcast zones comprise at least two multicast and broadcast (MBS) zones and the at least one communication resource comprises at least one of at least one designated frequency channel for data communication and at least one designated time slot.

14. The method of claim 10, further comprising generating one combined index reflective of the information indicated by the first index and the information indicated by the second index.

15. A communication system for providing resource allocation in a communication network, the system comprising:
at least one processor, the at least one processor being configured to:
identify at least two broadcast zones for receiving broadcast services in the communication network;
generate a first index based on a relative relationship among the at least two broadcast zones, the first index including information indicative of whether a first broadcast zone overlaps with at least one other broadcast zone, the at least one processor also being configured to generate a second index based on the relative relationship among the at least two broadcast zones, the second index including information indicative of a number of broadcast zones overlapped with the first broadcast zone;
assign at least one identifier to each of the at least two broadcast zones based on the first index and the second index, each identifier being associated with at least one communication resource, with distinct identifiers being assigned to overlapping broadcast zones of the at least two broadcast zones; and enable data transmissions to the at least two broadcast zones based on the assigned identifiers and using the at least one communications resource associated with the identifiers.

16. The system of claim 15, wherein the at least one processor is further configured to:

update the first index, when a variation to one of the at least two broadcast zones occurs, based on the relative relationship among the at least two broadcast zones, the updated first index including the information indicative of whether the first broadcast zone overlaps with at least one other broadcast zone;

re-assign the at least one identifier to each of the at least two broadcast zones based on the updated first index and the second index if the updated first index is different from the first index; and enable the data transmissions to the at least two broadcast zones based on the identifiers and using the at least one communications resource associated with the identifiers.

17. The system of claim 15, wherein the at least one processor, when assigning the at least one identifier to each of the at least two broadcast zones, is configured to assign a first broadcast zone and a second broadcast zone with one single identifier if the first and the second broadcast zones do not overlap; and the at least one processor is configured to enable the data transmissions to the first and second broadcast zones using a same communication resource.

18. The system of claim 15, wherein the at least one processor is further configured to provide information for identifying at least one base station for each of the at least two broadcast zones, the at least one base station being configured to transmit data using the at least one communication resource associated with the assigned identifier corresponding to a broadcast zone the base station is in.

19. The system of claim 15, wherein the at least two broadcast zones comprise at least two multicast and broadcast (MBS) zones and the at least one communication resource comprises at least one of at least one designated frequency channel for data communication and at least one designated time slot.

20. The system of claim 15, wherein the at least one processor is further configured to generate one combined index reflective of the information indicated by the first index and the information indicated by the second index.

21. The system of claim 15, wherein the at least one processor is further configured to generate the first index further comprises generating the first index as a first matrix, the first matrix including a plurality of matrix elements, each of the plurality of matrix elements corresponding to two of the at least two broadcast zones, the plurality of elements comprising a first value if the two corresponding broadcast zones overlap and a second value if the two corresponding broadcast zones do not overlap.

22. The system of claim 21, wherein the at least one processor is further configured to generate the second index as a first degree vector, the first degree vector including a plurality of vector elements, each of the plurality of vector elements being computed by summing the matrix elements of each column of the first matrix.

23. The system of claim 15, wherein the at least one processor is further configured to:

generate a second matrix, the second matrix including a plurality of matrix elements derived by multiplying elements of the first index with −1;

assign a first identifier of the at least one identifier to elements in a first column of the second matrix, the first column corresponding to a element in the second index having a maximum value; and assign a second identifier of the at least one identifier to elements in a second column of the second matrix, the second column corresponding to a column having a second largest value in the second index.

24. The system of claim 23, wherein the at least one processor is further configured to assign the first identifier to elements of the second column if the elements of the second column correspond to broadcast zones that do not overlap.

* * * * *